No. 849,466.  
PATENTED APR. 9, 1907.  
W. W. DONALDSON, Jr.  
SWIVEL CHECK VALVE.  
APPLICATION FILED MAY 29, 1905.

Witnesses:

William W. Donaldson, Jr.,
Inventor, by C. A. Snow & Co.
Attorneys.

UNITED STATES PATENT OFFICE.

WILLIAM W. DONALDSON, JR., OF KEWANEE, ILLINOIS.

SWIVEL CHECK-VALVE.

No. 849,466.  Specification of Letters Patent.  Patented April 9, 1907.

Application filed May 29, 1905. Serial No. 262,878.

*To all whom it may concern:*

Be it known that I, WILLIAM W. DONALDSON, Jr., a citizen of the United States, residing at Kewanee, in the county of Henry and State of Illinois, have invented a new and useful Swivel Check-Valve, of which the following is a specification.

This invention relates to swivel check-valves, and more particularly to one adapted for use in low-pressure water or steam systems.

The object of the invention is to provide a novel form of union in which the valve may readily be removed without uncoupling the pipe or disarranging the pipe system for the purpose of cleaning, regrinding the seat and swivel, or for effecting other repairs.

A further object is to simplify the construction of such valves, whereby their cost of manufacture will be reduced to a minimum.

With the above and other objects in view, as will appear as the nature of the invention is better understood, the same consists in the novel construction and combination of parts of a swivel check-valve, as will be hereinafter fully described and claimed.

Figure 1:
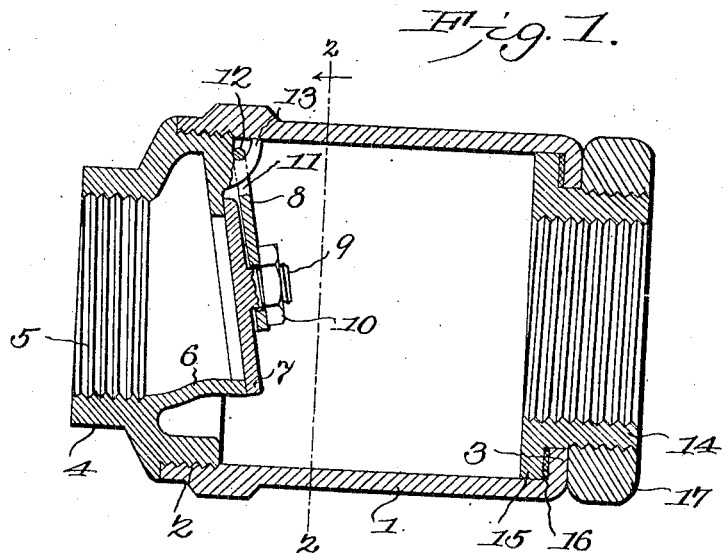
Figure 2:
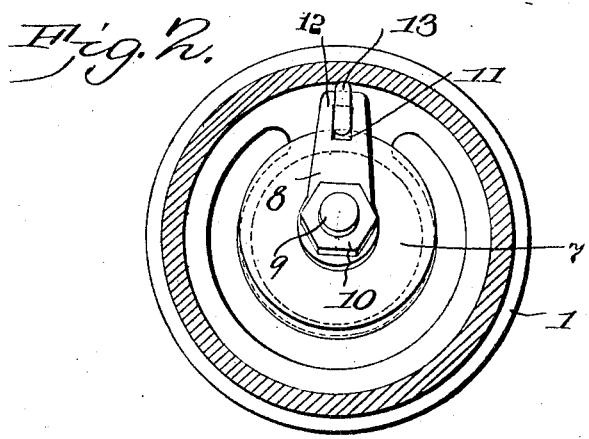

In the accompanying drawings, forming a part of this specification, and in which like characters of reference indicate corresponding parts, Figure 1 is a view in vertical longitudinal section through a combined check-valve and union constructed in accordance with the present invention. Fig. 2 is a view in vertical transverse section, taken on the line 2 2, Fig. 1, and looking in the direction of the arrow thereon.

Referring to the drawings, 1 designates the chamber or body of the valve, one end of which is internally threaded at 2, and the other end of which is inturned to form a flange 3. The threads 2 are engaged by similar threads of a coupling or hub member 4, which is provided with internal threads 5, to be engaged by the pipe with which the device coacts. The hub member 4 is provided with a valve-seat 6, that projects into the body, the face of the seat being disposed at an oblique angle to the long diameter of the body and is designed to be engaged by a valve 7, which is of the combined swiveled and rotary type, in order that the valve may constantly find a new seat, thereby to prevent uneven wear of the valve-seat. The valve is supported in operative position relatively to its seat by a hanger 8, the lower end of which is orificed to receive a threaded teat 9 on the valve, a nut 10, combined with the teat, serving to hold the two parts coöperatively related.

As shown in Fig. 1, the teat fits loosely within the orifice of the hanger to permit the valve to rotate freely therein. The upper end of the hanger is provided with an orifice 11, herein shown as rectangular in form, although it may be of any other desired contour, forming at the upper terminal of the hanger a bar 12, which is designed to engage a hook or support 13, preferably formed integral with the hub member and lying close to the inner wall of the chamber, thereby to preclude the possibility of any accidental separation of the hanger therefrom.

As shown in Fig. 2, the sides of the support are flat, and the walls of the orifice 11 engage these sides with sufficient closeness to prevent any lateral vibratory motion of the hanger relatively thereto, thus to insure under all conditions the proper coaction between the valve and its seat. By having the face of the valve-seat disposed at an angle to the long diameter of the body the valve will be caused to be self-seating and will always, when there is no pressure through the body which will tend to unseat the valve, remain properly seated, thereby to prevent any escape of liquid or steam past it. By combining the valve and the hanger in the manner described the proper coaction between the former and its seat will be secured, and by the manner of combining the hanger with the support 13 free swinging movement of the valve will be permitted without any possibility of accidental disconnection of the parts. The other hub member, with which the second pipe connects, consists of a sleeve 14, having a peripheral flange 15, that is designed to engage with the flange 3 of the body and between which parts a suitable packing 16 is interposed. The exterior of the sleeve is threaded to be engaged by a nut 17, which constitutes a locking-nut and will when seated draw the flanges 3 and 15 together in such manner as to secure a water and steam tight joint between them.

In assembling the parts of the device the hub 14 is first positioned and secured in place by the locking-nut, and thereafter the hub member 4 is combined with the body. When the parts are thus assembled, a thoroughly efficient and effective form of valve will be provided and one that will under all conditions be effective in use for the purposes designed.

Having thus described the invention, what is claimed is—

The combination with a pipe-section having one end thereof threaded and its opposite end provided with an inwardly-extending flange, of a hub member adapted to engage the threaded end of the pipe-section and having one end thereof threaded and its opposite end provided with an integral extension spaced from one wall of the hub member and having its free end inclined to form an obliquely-disposed valve-seat, a hook extending laterally from the hub at said valve-seat and having its bill inclined upwardly and adapted to engage the interior walls of the pipe-section when the hub is in position thereon, a hanger having an elongated rectangular recess in one end thereof for the reception of the hook and its opposite end provided with a transverse aperture, a valve adapted to engage the seat and provided with an integral threaded extension passing through the aperture in the hanger, a nut engaging the threaded end of the valve extension for securing the latter in position on the hanger, and a threaded sleeve swiveled in the flanged end of the pipe-section.

In testimony that I claim the foregoing as my own I have hereto affixed my signature in the presence of two witnesses.

WILLIAM W. DONALDSON, Jr.

Witnesses:
   CHAS. W. HUGHES,
   GEO. ISHAM.